United States Patent
Teeters (10) Patent No.: US 10,337,750 B2
(45) Date of Patent: Jul. 2, 2019

(54) SHADE APPARATUS FOR BROILER POULTRY HOUSE

(71) Applicant: Dandy Light Traps, Inc., Statesville, NC (US)

(72) Inventor: Kenneth W. Teeters, Mooresville, NC (US)

(73) Assignee: Dandy Light Traps, Inc., Statesville, NC (US)

( * ) Notice: Subject to any disclaimer, the term of this patent is extended or adjusted under 35 U.S.C. 154(b) by 0 days.

(21) Appl. No.: 15/407,428

(22) Filed: Jan. 17, 2017

(65) Prior Publication Data

US 2017/0198939 A1  Jul. 13, 2017

Related U.S. Application Data

(63) Continuation of application No. PCT/US2017/012950, filed on Jan. 11, 2017.
(Continued)

(51) Int. Cl.
*E06B 9/24* (2006.01)
*E06B 9/28* (2006.01)
(Continued)

(52) U.S. Cl.
CPC ............... *F24F 7/06* (2013.01); *A01K 31/22* (2013.01); *E06B 9/28* (2013.01); *E06B 9/386* (2013.01);
(Continued)

(58) Field of Classification Search
None
See application file for complete search history.

(56) References Cited

U.S. PATENT DOCUMENTS

| 313,865 A | * | 3/1885 | Hayes | F24F 13/082 454/280 |
| 925,144 A | * | 6/1909 | Ward | F24F 13/08 454/224 |

(Continued)

FOREIGN PATENT DOCUMENTS

| CA | 2028091 A1 | 3/1992 |
| DE | 8127831 U1 | 2/1982 |
| GB | 2205474 A | 12/1988 |

OTHER PUBLICATIONS

International Search Report for International Application No. PCT/US17/12950, dated Apr. 7, 2017.
(Continued)

*Primary Examiner* — Gregory L Huson
*Assistant Examiner* — Martha M Becton
(74) *Attorney, Agent, or Firm* — Ashley Law Firm P.C.; Stephen S. Ashley, Jr.

(57) ABSTRACT

A shade apparatus for use in broiler poultry houses can include a plurality of contoured vanes positioned in vertical alignment. Each vane can have first and second opposed lateral sides and is contoured upwardly such that the first lateral side resides below the second lateral side. The vanes are connected by a first plurality of spacers attached to the vanes proximate the first lateral side of the vanes, and a second plurality of spacers attached to the vanes proximate the second lateral side of the vanes. A portion of each vane extends over a horizontal axis defined by the first lateral side of a vane positioned immediately above. The apparatus can include brackets that facilitate mounting of the apparatus over a fan vent of a broiler poultry house and maintain the vanes a predetermined optimal distance from the fan vent.

20 Claims, 6 Drawing Sheets

Related U.S. Application Data (60) Provisional application No. 62/277,226, filed on Jan. 11, 2016.

(51) Int. Cl.
| | | |
|---|---|---|
| *F24F 7/06* | (2006.01) | |
| *A01K 31/22* | (2006.01) | |
| *E06B 9/386* | (2006.01) | |
| *F24F 13/15* | (2006.01) | |

(52) U.S. Cl.
CPC ...... *F24F 13/15* (2013.01); *E06B 2009/2458* (2013.01)

(56) References Cited

U.S. PATENT DOCUMENTS

| | | | | |
|---|---|---|---|---|
| 1,323,978 A * | 12/1919 | Gebhardt | ............ | E06B 7/03 454/221 |
| 1,673,906 A * | 6/1928 | Fager | ............ | E06B 7/082 454/279 |
| 1,934,337 A * | 11/1933 | Swanson | ............ | F24F 13/15 454/221 |
| 1,995,456 A * | 3/1935 | Kannel | ............ | F24F 13/08 160/104 |
| 2,010,808 A * | 8/1935 | Braine | ............ | F24F 3/1603 454/205 |
| 2,146,816 A | 2/1939 | Grassby | | |
| 2,364,378 A | 9/1942 | Levinsen | | |
| 2,620,869 A * | 12/1952 | Friedman | ............ | E06B 9/386 160/236 |
| 2,738,558 A * | 3/1956 | Davis | ............ | A01K 31/22 160/178.1 R |
| 2,757,727 A * | 8/1956 | Findell | ............ | E06B 9/386 160/168.1 R |
| 2,887,034 A * | 5/1959 | Gorth | ............ | F24F 13/15 454/358 |
| 2,985,093 A * | 5/1961 | Averill | ............ | F24F 13/15 454/284 |
| D194,410 S | 1/1963 | Bishop | | |
| 3,074,127 A * | 1/1963 | Ellis | ............ | E06B 9/28 160/176.1 P |
| 3,217,631 A * | 11/1965 | Thompson | ............ | E06B 7/082 160/236 |
| 3,285,156 A * | 11/1966 | Bohanon | ............ | F24F 13/08 454/277 |
| 3,378,955 A * | 4/1968 | Wahlgren | ............ | E06B 9/28 49/397 |
| 3,584,566 A * | 6/1971 | McCabe | ............ | F24F 13/075 454/352 |
| 3,628,442 A | 12/1971 | Nijhuis | | |
| 3,682,084 A * | 8/1972 | Tarnoff | ............ | F24F 13/08 454/359 |
| 5,133,692 A | 7/1992 | Koop | | |
| 5,238,451 A * | 8/1993 | Wulf | ............ | A01K 1/0047 454/282 |
| 5,277,658 A * | 1/1994 | Goettl | ............ | F24F 11/043 137/512.1 |
| 5,306,210 A * | 4/1994 | Smit | ............ | E04B 7/163 454/250 |
| 5,601,485 A * | 2/1997 | Gigola | ............ | A01K 1/0064 454/277 |
| 5,999,323 A * | 12/1999 | Wood | ............ | E04D 13/033 359/591 |
| 6,318,441 B1 * | 11/2001 | Love | ............ | E06B 9/303 160/178.1 R |
| 6,588,372 B1 * | 7/2003 | Terrell | ............ | A01K 1/0082 119/448 |
| 6,644,377 B1 * | 11/2003 | Lewis | ............ | E06B 9/36 160/115 |
| 7,156,051 B2 | 1/2007 | Lorton et al. | | |
| 7,722,449 B2 * | 5/2010 | Nowak | ............ | F24F 13/082 454/270 |
| 8,684,803 B2 * | 4/2014 | Berkompas | ............ | F24F 13/082 454/277 |
| 8,714,758 B2 | 5/2014 | Strickland et al. | | |
| 2007/0163726 A1 * | 7/2007 | Lewis | ............ | E06B 9/28 160/168.1 R |
| 2007/0175599 A1 | 8/2007 | Froese | | |
| 2007/0256372 A1 | 11/2007 | Vagedes | | |
| 2010/0314053 A1 | 12/2010 | Buser | | |
| 2012/0024809 A1 | 2/2012 | Rowan | | |
| 2012/0085503 A1 * | 4/2012 | Kotin | ............ | E06B 7/09 160/174 V |
| 2013/0292066 A1 * | 11/2013 | Draper | ............ | E06B 9/322 160/107 |
| 2013/0306254 A1 * | 11/2013 | Cheou | ............ | E06B 7/086 160/176.1 P |

OTHER PUBLICATIONS

Written Opinion of the International Searching Authority or International Application No. PCT/US17/12950, dated Apr. 7, 2017.

English translation of abstract of German Patent Publication No. DE8127831U1, dated Feb. 4, 1982.

Red Truck Supply, Inc.; Darkout Systems manual; date unknown.

Red Truck Supply, Inc.; Darkout Systems assembly manual; date unknown.

* cited by examiner

SHADE APPARATUS FOR BROILER POULTRY HOUSE

CROSS REFERENCE TO RELATED APPLICATIONS

This application is a continuation of International Application No. PCT/US17/12950, filed Jan. 11, 2017, which claims priority to U.S. Provisional Patent Application No. 62/277,226, filed Jan. 11, 2016. Said applications are incorporated by reference herein. Also incorporated by reference herein is U.S. patent application Ser. No. 29/590,459, filed Jan. 10, 2017.

TECHNICAL FIELD OF INVENTION

The present invention relates to agriculture, and poultry science in particular. An embodiment of the invention comprises a shade apparatus for use in broiler poultry houses comprising a plurality of angled vanes joined by spacers, in which the vanes are oriented vertically one on top of the other and angled upwardly toward the ceiling.

BACKGROUND OF INVENTION

In-house lighting control is very important in today's poultry houses, particularly in broiler houses in which birds are grown for consumption. Integrators have specific lighting programs that require growers to adhere to and rely on light control inside the house to maximize bird health and production. During the first stage of a bird's life, known as brooding, lights are typically on full bright for one to two weeks. The lights are then slowly dimmed per the integrators' requirements until the end of the flock. At this point, the lights are set to a very dim level. Control of the lights is important for many reasons, but most importantly, it has a significant impact on the feed conversion of the flock. "Feed conversion" refers to the ratio of the number of pounds of feed required to add one pound of weight to an individual bird. It is critical to keep the houses very dark and avoid unwanted light, especially at the end of the flock when the birds are nearing market size. If the light is properly controlled, the birds continue to eat, but do not move around excessively and burn off ingested food. Thus, consistent precision light control allows flocks to uniformly increase weight without wasting excess feed in the process.

While light control can have a significant impact on feed conversion, a broiler house must also be well ventilated for the comfort of the birds. Adequate ventilation is typically accomplished by numerous fans pulling fresh air into the broiler house by means of either sidewall air vents or larger sidewall tunnel openings. The amount of air required varies by the age and size of the birds and the outside climate. Ventilation can be intermittent or continuous based on the needs of the birds.

Typically, when ventilation fans come on, light streams into the poultry house, and reaches as far as 150 feet or more in the house. Current light control products cannot control this light intrusion at the fans without a significant reduction in airflow. Light control products currently available to the broiler industry negatively affect the airspeed, airflow, and static pressure inside the houses. Accordingly, there is a need for a product that can achieve a desired balance between light and ventilation control simultaneously.

SUMMARY OF INVENTION

Accordingly, an object of the present invention is to provide a device that can control light entering through ventilation vents of a broiler house. Another object of the present invention is to provide a device that controls light entering a poultry house with reduced negative impact on the ventilation system of the poultry house. These and other objectives of the invention can be achieved in various embodiments of the invention described herein.

One embodiment of the invention comprises a shade apparatus for use in broiler poultry houses. The apparatus includes a plurality of contoured vanes positioned in vertical alignment. Each vane has first and second opposed lateral sides and is contoured upwardly such that the first lateral side resides below the second lateral side. A first plurality of spacers is attached to the vanes proximate the first lateral side, and a second plurality of spacers is attached to the vanes proximate the second lateral side. A portion of each of the plurality of vanes extends over a horizontal axis defined by the first lateral side of a vane positioned immediately above.

According to another embodiment of the invention, the apparatus includes mounting brackets that facilitate mounting of the apparatus over a fan vent of a broiler poultry house. The brackets maintain the vanes a predetermined optimal distance from the fan vent.

According to another embodiment of the invention, one-half inch of each of vane extends over the horizontal axis defined by the first lateral side of a vane positioned immediately above.

According to another embodiment of the invention, each spacer has a height of three to five inches.

According to a preferred embodiment of the invention, each spacer has a height of 4½ inches.

According to another embodiment of the invention, there is a distance of four inches between the first plurality of spacers and the second plurality of spacers.

Figure 6:
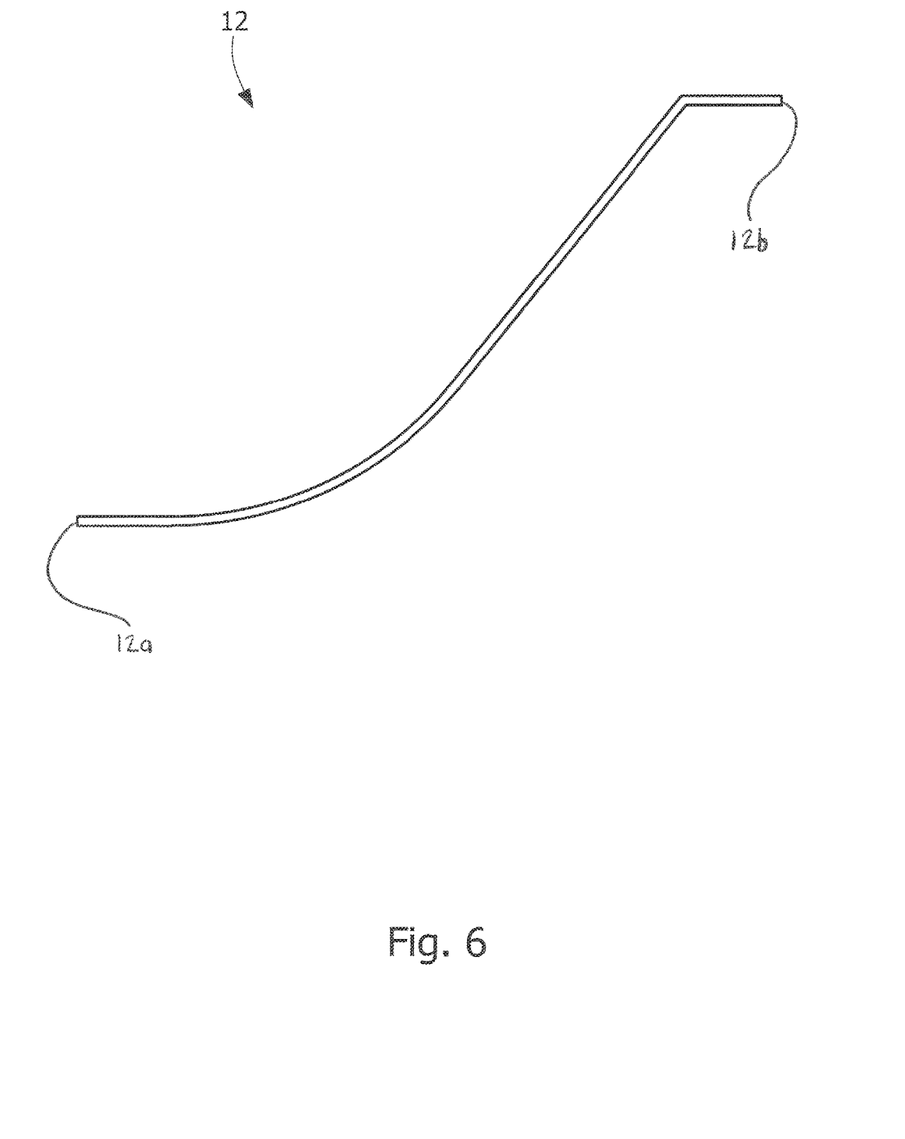
FIG. 6 is a side view of a vane according to a preferred embodiment of the invention.

According to another embodiment of the invention, each vane has the contoured shape illustrated in FIG. 6.

According to another embodiment of the invention, the apparatus comprises fifteen contoured vanes.

According to another embodiment of the invention, the apparatus can include means for mounting over a fan vent of a poultry house.

According to another embodiment of the invention, the plurality of contoured vanes includes a top vane positioned above all other vanes and a bottom vane positioned below all other vanes. At least one upper bracket can be attached to the top vane, and at least one lower bracket can be attached to the bottom vane. The upper and lower brackets are adapted for mounting the apparatus over a fan vent of a poultry house.

According to another embodiment of the invention, the apparatus can include a mounting plate adapted for mounting on a wall proximate the fan vent. The mounting plate can have at least one slot formed therein for receiving and engaging the lower bracket(s).

According to another embodiment of the invention, the upper and lower brackets maintain the contoured vanes a distance of ten to eighteen inches from the fan vent.

According to a preferred embodiment of the invention, the upper and lower brackets maintain the contoured vanes a distance of fifteen inches from the fan vent.

According to another embodiment of the invention, the apparatus decreases airflow in poultry houses by no more than 2.5% and increases static pressure in the poultry house by no more than 0.01 inches of water.

A shade apparatus according to another embodiment of the invention comprises a plurality of contoured vanes positioned in vertical alignment with each other and comprising a top vane and a bottom vane and at least one vane positioned therebetween. Each vane has first and second opposed lateral sides and is contoured upwardly, such that the first lateral side resides below the second lateral side. A first plurality of spacers is attached to the vanes proximate the first lateral side of the vanes, and a second plurality of spacers is attached to the vanes proximate the second lateral side of the vanes. At least one upper bracket is attached proximate the top vane, and at least one lower bracket attached proximate the bottom vane. The upper and lower brackets are adapted for mounting the apparatus over a fan vent of a broiler poultry house and maintain the plurality of contoured vanes a predetermined distance of ten to eighteen inches from the fan vent.

According to a preferred embodiment of the invention, the upper and lower brackets maintain the vanes a distance of fifteen inches from the fan vent.

According to another embodiment of the invention, the apparatus includes two upper brackets and three lower brackets.

According to another embodiment of the invention, a portion of each of the plurality of contoured vanes extends over a horizontal axis defined by the first lateral side of a vane positioned immediately above.

According to a preferred embodiment of the invention, one-half inch of each of the plurality of contoured vanes extends over a horizontal axis defined by the first lateral side of a vane positioned immediately above.

According to another embodiment of the invention, each spacer has a height of 4½ inches, and there is a distance of four inches from the first plurality of spacers to the second plurality of spacers.

Another embodiment of the invention comprises a method of minimizing the entry of light into a broiler poultry house. The method includes providing a shade apparatus comprising a plurality of contoured vanes positioned in vertical alignment with each other. There is a top vane and a bottom vane and a plurality of vanes positioned therebetween. Each of the plurality of contoured vanes has first and second opposed lateral sides and is contoured upwardly, such that the first lateral side resides below the second lateral side. A first plurality of spacers is attached to the vanes proximate the first lateral side of the vanes, and a second plurality of spacers is attached to the vanes proximate the second lateral side of the vanes. At least one lower bracket is mounted below a fan vent of the broiler poultry house, and is attached proximate the bottom vane. At least one upper bracket is mounted above the fan vent, and is attached proximate the top vane.

DETAILED DESCRIPTION OF PREFERRED EMBODIMENTS OF INVENTION

Figure 1:
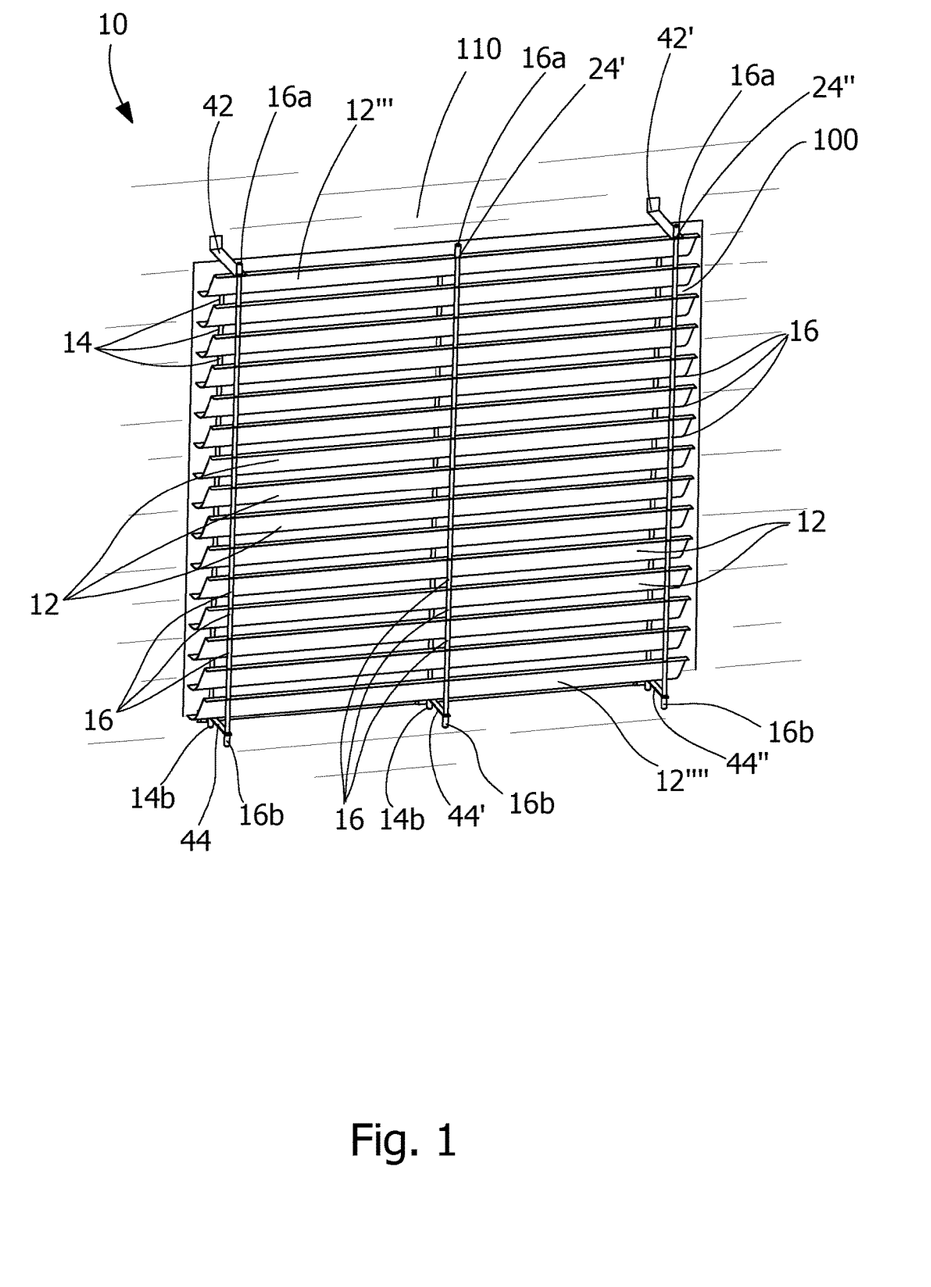
FIG. 1 is a perspective view of a shade apparatus according to a preferred embodiment of the invention.
Figures 2, 3:
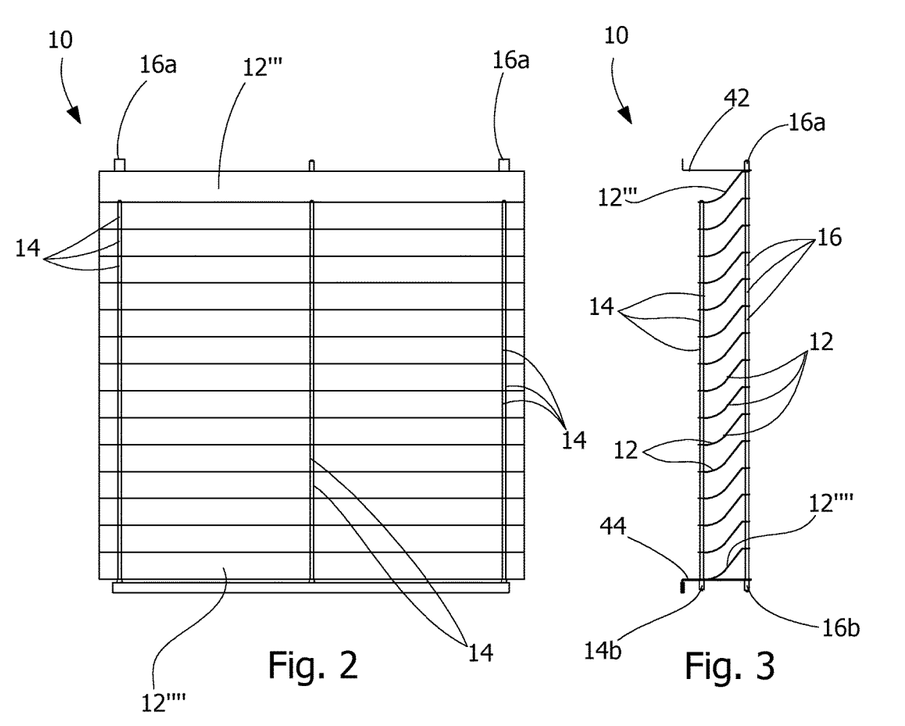
FIG. 2 is a front elevation of the shade apparatus of FIG. 1.
FIG. 3 is a side elevation of the shade apparatus of FIG. 1.
Figures 4, 4A, 4B:
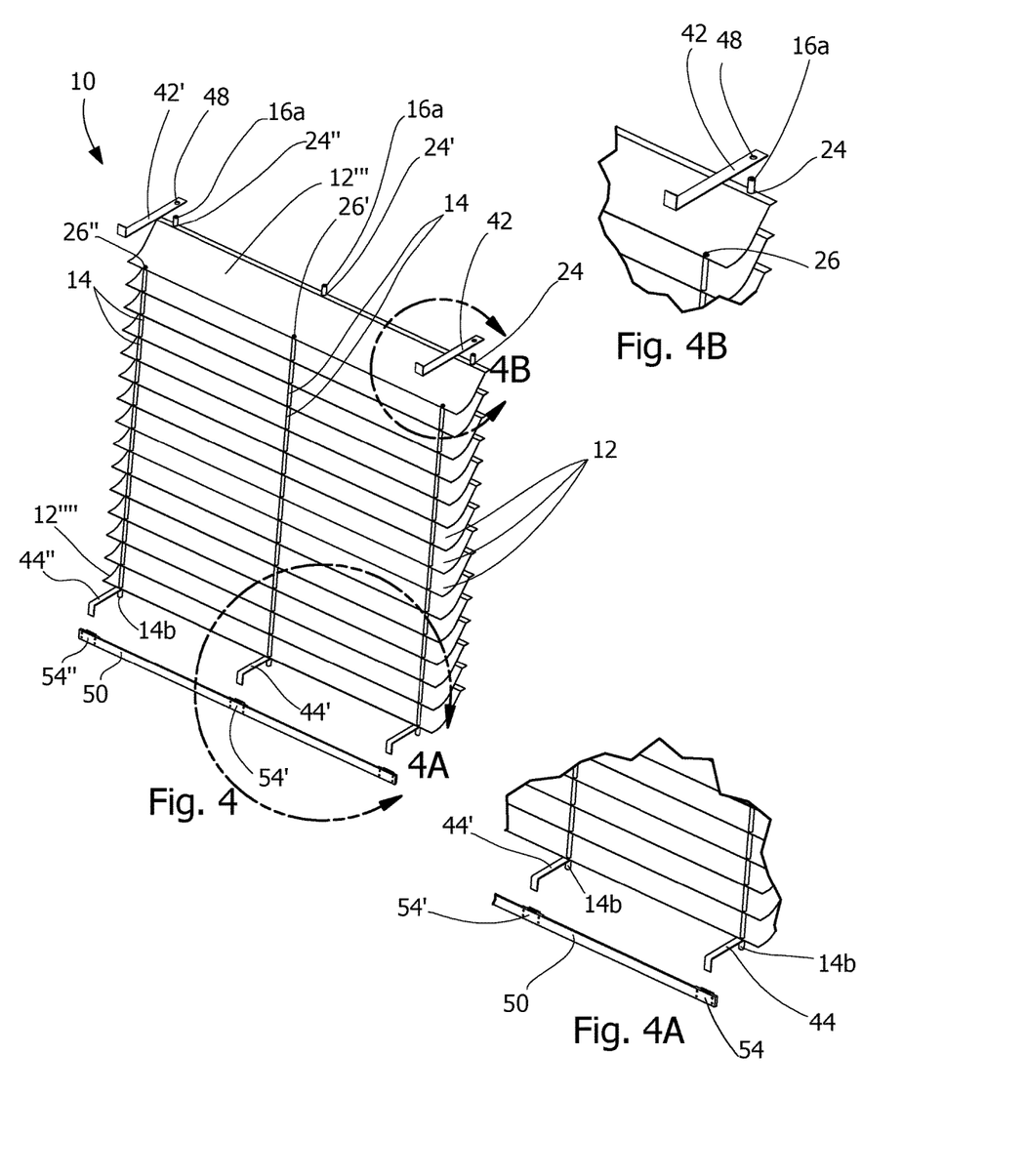
FIG. 4 is another perspective view of the shade apparatus of FIG. 1.
FIG. 4A is a partial enlarged view of the shade apparatus of FIG. 1.
FIG. 4B is another partial enlarged view of the shade apparatus of FIG. 1.
Figure 5:
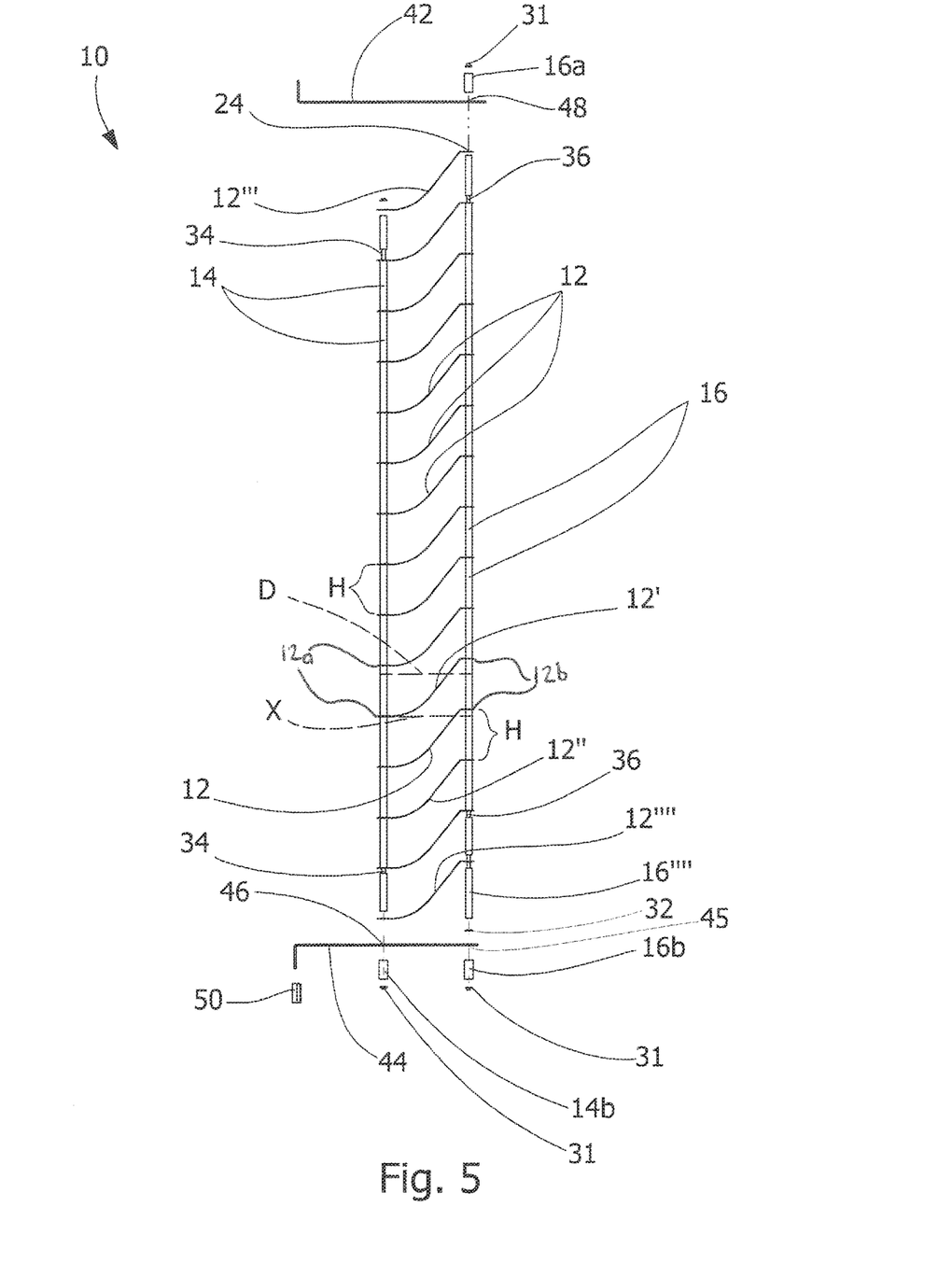
FIG. 5 is a side partially exploded side elevation of the shade apparatus of FIG. 1.

A shade apparatus according to a preferred embodiment of the invention is illustrated in FIGS. 1-7, and shown generally at reference numeral 10. The shade apparatus 10 comprises a plurality of vanes 12 having a contoured shape as shown in FIGS. 3, 5 and 6. The vanes 12 are joined together by a first plurality of linearly aligned spacers 14 and a second plurality of linearly aligned spacers 16, as shown in FIGS. 1-5. Preferably, there are fifteen vanes 12, and each vane 12 is approximately eight inches wide. The vanes 12 can be made of plastic or other suitable material, and can be assembled together horizontally.

As shown in FIG. 4, a first plurality of openings comprised of three spaced apart holes 24, 24', 24" are formed proximate a first side of each of the vanes 12, and a corresponding second plurality of openings comprised of three spaced apart holes 26, 26', 26" are formed proximate the opposite side of each of the vanes 12. The holes 24, 24', 24", 26, 26', 26" are formed at the same locations on each vane 12 so that the holes 24, 24', 24", 26, 26', 26" of all vanes are linearly aligned. A single rod 34 can be positioned through each of the first plurality of holes 24, 24', 24" of the vanes 12 and likewise a rod 36 can be positioned through each of the second plurality of holes 26, 26', 26" of the vanes 12, as demonstrated in FIG. 5. Each spacer 14 can be telescopically positioned over the rod 34 in between each vane 12, and likewise each spacer 16 can be telescopically positioned over the rod 36 in between each vane 12, as shown in FIG. 5.

The vanes 12 are positioned one above the other, as shown in FIGS. 3 and 5, with the vanes 12 angled upwardly from the first plurality of spacers 14 to the second plurality of spacers 16. Each vane 12 has first and second opposed sides 12a, 12b. As shown in FIGS. 5 and 6, the vane 12 is contoured upwardly from the first side 12a, which defines the lowermost side of the vane 12, to the second side 12b, which defines the uppermost side of the vane 12. It is critical that each spacer 14, 16 be three to five inches long, and that there is an overlap of ½ from vane 12 to vane 12. Preferably, the distance "D" between the first plurality of spacers 14 and the second plurality of spacers 16 is 4½ inches, and each spacer 14, 16 has a height "H" of four inches, as shown in FIG. 3. As such, each vane 12 is separated from the vane 12' immediately above and the vane 12" immediately below by four inch spacers 14, 16, resulting in an overlap of ½ inch. Each vane 12 extends upwardly ½ inch over the horizontal plane "X" defined by the lowermost side 12a of the vane 12' positioned immediately above and extending horizontally toward the second side 12b, as shown in FIG. 5. When installed on a structure, such as a broiler poultry house, this ½ inch "overlap" blocks most direct light from entering the house and diverts the light that does enter away from the floor of the house.

FIG. 6 shows the side profile of each vane 12. Additional views of the shade apparatus 10 without the mounting brackets 42, 42', 44, 44', 44" are shown in U.S. patent application Ser. No. 29/590,459, which is incorporated by reference herein.

The shade apparatus 10 can include means for mounting the apparatus 10 over a structure, such as an exhaust fan vent of a broiler poultry house. The mounting means can comprise a plurality of upper brackets positioned at the top of the apparatus 10 and a plurality of lower brackets at the bottom of the apparatus. The plurality of upper brackets can be comprised of a pair of upper brackets 42, 42' and the plurality of lower brackets can be comprised of three lower brackets 44, 44', 44", as shown in FIGS. 4 and 4A. As shown in FIGS. 4 and 5, the two upper brackets 42, 42' are attached at the top of the uppermost vane 12''', and the three lower brackets 44, 44', 44" are attached at the bottom of the lowermost vane 12''''. The brackets 42, 42', 44, 44', 44" can be made of metal, plastic or other suitable material. Preferably, the upper brackets 42, 42' are made of plastic or other flexible material, and the lower brackets 44, 44', 44" are made of metal.

Each lower bracket 44, 44', 44" has a pair of holes 45, 46 for receiving two shortened lower spacers 14b, 16b, as shown in FIGS. 1, 3, 5 and 7. Preferably, each of the shortened lower spacers 14b, 16b is 1½ inches long. End caps 31 can be used to maintain the lower spacers 14b, 16b in place, as shown in FIG. 5. A washer 32 can be positioned between the bottom most spacer 16'''' and each lower bracket 44, 44', 44", as shown in FIG. 5, to prevent the spacer 16'''' from going through the brackets 44, 44', 44". Each upper bracket 42, 42' has a hole 48 formed therein that receives a shortened upper spacer 16a, as shown in FIGS. 4 and 4B. Preferably, each of the shortened upper spacers 16a is 1½ inches long. End caps 31 can be used to maintain the shortened upper spacers 14a in place, as shown in FIG. 5.

Figure 7:
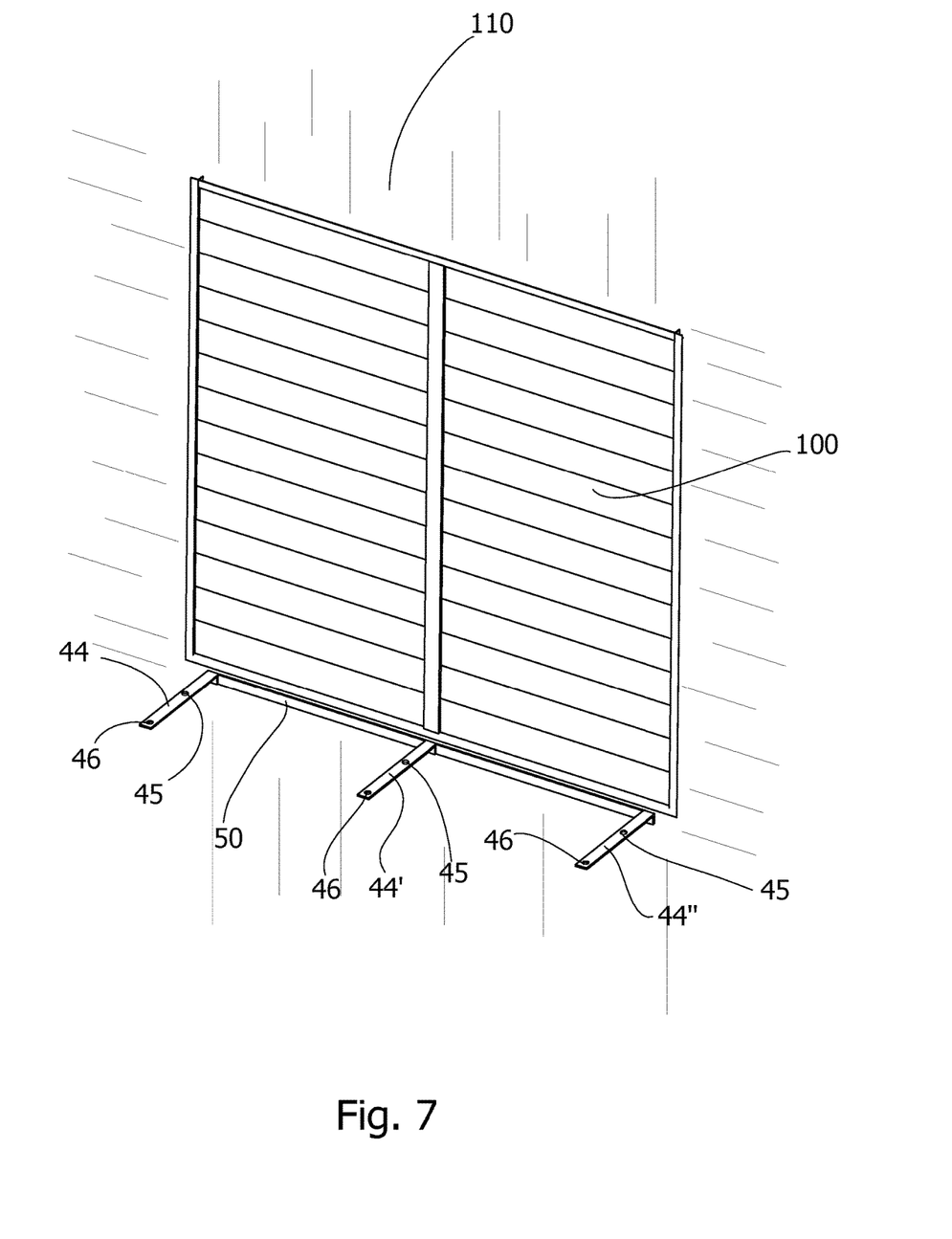
FIG. 7 is an environmental perspective view of a portion of the shade apparatus of FIG. 1.

In a method of using the shade apparatus 10 according to a preferred embodiment of the invention, the apparatus 10 is installed over the exhaust fan vent 100 of a broiler poultry house, as shown in FIG. 1. A mounting plate 50 having three slots 54, 54', 54" formed therein is attached below the exhaust fan vent 100, as shown in FIGS. 4, 4A and 7. The lower brackets 44, 44', 44" are mounted in the slots 54, 54', 54" of the mounting bracket 50, as shown in FIG. 7. The lower spacers 14b, 16b are placed into the holes 45, 46 of the brackets 44, 44', 44", with the first plurality of spacers 14 facing the fan vent 100, and the second plurality of spacers 16 facing the interior of the broiler poultry house. The upper brackets 42, 42' are attached to the wall 110 above the fan vent 100, as shown in FIGS. 1 and 3. The upper brackets 42, 42' can be attached to the wall 110 by screws or other suitable fasteners. After the lower spacers 14b, 16b are positioned in the lower bracket holes 45, 46, the upper spacers 16a are positioned in the upper bracket holes 48. The mounting plate 50 and upper and lower brackets 42, 42', 44, 44', 44" insure that the vanes 12 are positioned a predetermined optimal distance from the fan vent 100. Preferably, the vanes 12 are positioned ten to eighteen inches from the fan vent 100. Most preferably, the vanes 12 are fifteen inches from the fan vent 100. The mounting plate 50 and upper and lower brackets 42, 42', 44, 44', 44" allow for easy installation and removal of the apparatus 10.

The apparatus 10 can fit over any exhaust fan on the poultry house interior. The apparatus 10 can be modified for installation on sidewall vents of poultry houses to control the light entering through the sidewall vents.

The apparatus 10 blocks out direct sunlight while allowing air to flow as freely as possible through the apparatus 10 and into the broiler poultry house. The apparatus 10 raises static pressure of the poultry house by a maximum of 0.01-0.02 inches of water column based on Bess Lab Test (15593). The apparatus 10 can provide full light control regardless of the time of year, the climate, or the age of the flock.

When the fans are activated to allow ventilation, the apparatus 10 effectively blocks light from entering the broiler poultry house while allowing air to flow freely into the house. As such, the apparatus 10 allows for adequate ventilation without disrupting the integrator's desired lighting program. The apparatus 10 helps achieve better feed conversion, a larger bird, and reduced mortality. The light control provided by the shade apparatus 10 is also believed to improve the infectious process (IP), because it reduces excess movement and keep the birds calmer. As such, the birds are not as prone to cutting or scratching themselves or other birds due to increased agitation when the exhaust fans suddenly turn on and startle them with intense light intrusion. The apparatus 10 provides improved control over the light entering the broiler poultry house, leading to the production of a larger, healthier bird, with better feed conversion, and improved animal welfare as well.

The apparatus 10 does not completely block all light but diverts direct sunlight away from the floor of the broiler house. Known devices used to block light in poultry houses typically decrease the airflow in the poultry houses by 12-34% and increase static pressure by 0.12-0.20 inches of water (in.$H_2O$) to the house. The shade apparatus 10 of the present invention effectively protects poultry houses from unwanted light intrusion while decreasing the airflow by only 2.5% and increasing static pressure in the house by only 0.01 in. $H_2O$.

The shade apparatus 10 does not include a frame enclosing the vanes 12 and covering the top, bottom and/or sides of the assembled, installed apparatus 10. The lack of a frame, the distance of fifteen inches from the apparatus 10 to the exhaust fan vent 100, the spacing between the vanes 12 and the shape of the vanes 12 all contribute to efficacy of the apparatus 10.

A shade apparatus for use in a broiler poultry house is described above. Various changes can be made to the invention without departing from its scope. The above description of various embodiments of the invention are provided for the purpose of illustration only and not limitation—the invention being defined by the claims and equivalents thereof.

What is claimed is:

1. A shade apparatus for use in broiler poultry houses comprising:
    (a) a plurality of contoured vanes positioned in vertical alignment comprising a top vane and a bottom vane and at least one vane positioned therebetween, each of the plurality of contoured vanes having first and second opposed sides and being contoured upwardly, wherein the first side defines a lowermost side and the second side defines an uppermost side, the first side defining a horizontal plane extending from the first side toward the second side;
    (b) a first plurality of attachment members attached to the vanes proximate the first side of the vanes, and a second plurality of attachment members attached to the vanes proximate the second side of the vanes, wherein the vanes are connected by the first plurality of attachment members and the second plurality of attachment members; and
    (c) at least one upper bracket attached to the top vane, and at least one lower bracket attached to the bottom vane, wherein the at least one upper bracket and the at least one lower bracket are adapted for mounting the apparatus over a fan vent of a broiler poultry house and maintain the plurality of contoured vanes a distance of ten to eighteen inches from the fan vent.

2. The shade apparatus according to claim 1, wherein the at least one upper bracket and the at least one lower bracket maintain the plurality of contoured vanes a distance of fifteen inches from the fan vent.

3. The shade apparatus according to claim 2, wherein the first side and the second side of each contoured vane define a length of the vane, and further wherein one-half inch of length beginning from the second side of each vane extends above the horizontal plane defined by the first side of a vane positioned immediately above.

4. The shade apparatus according to claim 1, wherein the at least one upper bracket comprises first and second upper brackets, and the at least one lower bracket comprises first, second and third upper brackets.

5. The shade apparatus according to claim 1, wherein the first plurality of attachment members comprises a first plurality of rods positioned through the vanes proximate the first side of each vane, and a first plurality of spacers positioned on the first plurality of rods, and wherein the second plurality of attachment members comprises a second plurality of rods positioned through the vanes proximate the second side of each vane and a second plurality of spacers positioned on the second plurality of rods, the first plurality of spacers and the second plurality of spacers positioned between the vanes to maintain a predetermined space between the vanes.

6. A method of minimizing the entry of light into a broiler poultry house comprising the steps of:
   (a) providing a shade apparatus comprising:
      (i) a plurality of contoured vanes positioned in vertical alignment comprising a top vane and a bottom vane and at least one vane positioned therebetween, each of the plurality of contoured vanes having first and second opposed sides and being contoured upwardly, wherein the first side defines a lowermost side resides below and the second lateral side defines an uppermost side, the first side defining a horizontal plane extending from the first side toward the second side, wherein the second side of each vane extends above the horizontal plane defined by the first side of a vane positioned immediately above,
      (ii) a first plurality of rods positioned through the vanes proximate the first side of each vane, and a second plurality of rods positioned through the vanes proximate the second side of each vane, and
      (ii) a first plurality of spacers positioned on the first plurality of rods between the vanes, and a second plurality of spacers positioned on the second plurality of rods between the vanes;
   (c) attaching at least one lower bracket below a fan vent of the broiler poultry house;
   (d) attaching the at least one lower bracket proximate the bottom vane;
   (e) attaching at least one upper bracket above the fan vent; and
   (f) attaching the at least one upper bracket proximate the top vane.

7. A shade apparatus for use in broiler poultry houses comprising:
   (a) a plurality of vanes positioned in vertical alignment, each vane having a first side and a second side opposed to the first side, each vane contoured upwardly wherein the first side defines a lowermost side and the second side defines an uppermost side, the first side defining a horizontal plane extending horizontally from the first side toward the second side;
   (b) a first plurality of attachment members attached to the vanes proximate the first side, and a second plurality of attachment members attached to the vanes proximate the second side, wherein the vanes are connected by the first plurality of attachment members and the second plurality of attachment members; and
   (c) wherein the second side of each vane extends above the horizontal plane defined by the first side of a vane positioned immediately above.

8. The shade apparatus according to claim 7, wherein each of the plurality of vanes has a contoured shape as shown in FIG. 6.

9. The shade apparatus according to claim 7, wherein the plurality of vanes comprises fifteen vanes.

10. The shade apparatus according to claim 7, further comprising means for mounting the apparatus over a fan vent of a poultry house.

11. The shade apparatus according to claim 7, wherein the plurality of vanes includes a top vane positioned above all other vanes and a bottom vane positioned below all other vanes, and further comprising at least one upper bracket attached to the top vane, and at least one lower bracket attached to the bottom vane, wherein the at least one upper bracket and at least one lower bracket are adapted for mounting the apparatus over a fan vent of a poultry house.

12. The shade apparatus according to claim 11, further comprising a mounting plate adapted for mounting on a wall proximate the fan vent and having at least one slot formed therein for receiving and engaging the at least one lower bracket.

13. The shade apparatus according to claim 11, wherein the at least one upper bracket and the at least one lower bracket maintain the plurality of vanes ten to eighteen inches from the fan vent.

14. The shade apparatus according to claim 13, wherein the at least one upper bracket and the at least one lower bracket maintain the plurality of vanes fifteen inches from the fan vent.

15. The shade apparatus according to claim 7, wherein the apparatus decreases airflow in the poultry house by no more than 2.5% and increases static pressure in the poultry house by no more than 0.01 inches of water.

16. The shade apparatus according to claim 7, wherein the first side and the second side of each vane define a length of the vane, and further wherein one-half inch of length beginning from the second side of each vane extends above the horizontal plane defined by the first side of a vane positioned immediately above.

17. The shade apparatus according to claim 7, wherein the first plurality of attachment members comprises a first plurality of rods positioned through the vanes proximate the first side of each vane, and a first plurality of spacers positioned on the first plurality of rods, and wherein the second plurality of attachment members comprises a second plurality of rods positioned through the vanes proximate the second side of each vane and a second plurality of spacers positioned on the second plurality of rods, the first plurality of spacers and the second plurality of spacers positioned between the vanes to maintain a predetermined space between the vanes.

18. The shade apparatus according to claim 17, wherein each of the first plurality of spacers and each of the second plurality of spacers has a height in the range of three to five inches.

19. The shade apparatus according to claim 18, wherein each of the first plurality of spacers and each of the second plurality of spacers has a height of 4½ inches.

20. The shade apparatus according to claim 19, wherein the first plurality of spacers and the second plurality of spacers define a distance of four inches therebetween.

* * * * *